United States Patent
Luick

(10) Patent No.: US 7,086,058 B2
(45) Date of Patent: Aug. 1, 2006

(54) METHOD AND APPARATUS TO ELIMINATE PROCESSOR CORE HOT SPOTS

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 10/163,968

(22) Filed: Jun. 6, 2002

(65) Prior Publication Data
US 2003/0229662 A1   Dec. 11, 2003

(51) Int. Cl.
G06F 9/46 (2006.01)
G06F 15/00 (2006.01)
G06F 11/00 (2006.01)
G01K 15/00 (2006.01)
H02H 5/04 (2006.01)
G06F 13/24 (2006.01)

(52) U.S. Cl. .................. 718/102; 702/99; 702/130; 702/132; 702/188; 714/39; 361/103; 710/260

(58) Field of Classification Search ........ 718/100–108; 713/300, 322, 340, 501; 702/99–188; 710/260; 714/39; 361/103
See application file for complete search history.

(56) References Cited

U.S. PATENT DOCUMENTS

| | | | | |
|---|---|---|---|---|
| 4,887,181 A * | 12/1989 | Lenz | ............................ | 361/103 |
| 5,502,838 A | 3/1996 | Kikinis | ........................ | 395/550 |
| 5,557,551 A * | 9/1996 | Craft | ............................ | 702/130 |
| 5,752,011 A * | 5/1998 | Thomas et al. | ............. | 713/501 |
| 5,826,079 A * | 10/1998 | Boland et al. | .............. | 718/102 |
| 5,835,885 A * | 11/1998 | Lin | .............................. | 702/99 |
| 5,860,137 A * | 1/1999 | Raz et al. | .................... | 711/202 |
| 5,974,557 A * | 10/1999 | Thomas et al. | ............. | 713/322 |
| 6,047,248 A * | 4/2000 | Georgiou et al. | ........... | 702/132 |
| 6,078,944 A * | 6/2000 | Enko et al. | ................. | 718/105 |
| 6,160,755 A * | 12/2000 | Norman et al. | ............. | 365/233 |
| 6,237,058 B1 * | 5/2001 | Nakagawa | .................. | 710/260 |
| 6,298,370 B1 * | 10/2001 | Tang et al. | ................. | 718/102 |
| 6,349,385 B1 * | 2/2002 | Kaminski et al. | ........... | 713/300 |
| 6,442,700 B1 * | 8/2002 | Cooper | ........................ | 713/320 |
| 6,470,289 B1 * | 10/2002 | Peters et al. | ................ | 702/132 |
| 6,631,474 B1 * | 10/2003 | Cai et al. | ..................... | 713/300 |
| 6,654,894 B1 * | 11/2003 | Kaminski et al. | ........... | 713/300 |
| 6,681,282 B1 * | 1/2004 | Golden et al. | .............. | 710/302 |
| 6,728,959 B1 * | 4/2004 | Merkey | ....................... | 718/102 |

(Continued)

OTHER PUBLICATIONS

Cheng et al., "An Efficient Method for Hot-Spot Identification in ULSI Circuits", IEEE, pp. 124-127.*

Primary Examiner—Meng-Al T. An
Assistant Examiner—Jennifer N. To
(74) Attorney, Agent, or Firm—Robert R. Williams

(57) ABSTRACT

Methods and apparatus are provided for eliminating hot spots on processor chips in a symmetric multiprocessor (SMP) computer system. Some operations, in particular, floating point multiply/add, repetitively utilize portions of a processor chip to the point that the average power of the affected portions exceeds cooling capabilities. The localized temperature of the affected portions can then exceed design limits. The current invention determines when a hot spot occurs and task swaps the task to another processor prior to the localized temperature becoming too hot. Moving of tasks to processors that have data affinity with the processor reporting a hot spot is considered. Further considerations include prioritizing unused processors and those processors that have not recently reported a hot spot.

6 Claims, 15 Drawing Sheets

U.S. PATENT DOCUMENTS

| | | | |
|---|---|---|---|
| 6,789,037 B1 * | 9/2004 | Gunther et al. | 702/132 |
| 6,804,632 B1 * | 10/2004 | Orenstien et al. | 702/188 |
| 6,859,882 B1 * | 2/2005 | Fung | 713/300 |
| 6,892,312 B1 * | 5/2005 | Johnson | 713/320 |
| 6,934,658 B1 * | 8/2005 | Clabes et al. | 702/132 |
| 2002/0143488 A1 * | 10/2002 | Cooper | 702/132 |
| 2003/0041289 A1 * | 2/2003 | Ku et al. | 714/39 |
| 2003/0110012 A1 * | 6/2003 | Orenstien et al. | 702/188 |

* cited by examiner

| INSTR NUMBER | INSTR | CREATE POWER TOKEN | POWER TOKEN | POWER TOKEN SUM |
|---|---|---|---|---|
| 1 | LOAD | | 3 | 3 |
| 2 | STORE | | 5 | 8 |
| 3 | FPMADD | | 10 | 18 |
| 4 | BRANCH | POWER TOKEN GENERATOR | 4 | 22 |
| 5 | FPMADD | | 10 | 32 |
| 6 | FPMADD | | 10 | 42 |
| 7 | FPMADD | | 10 | 52 |
| 8 | FPMADD | | 10 | 62 |
| 9 | FPMADD | | 10 | 72 |
| 10 | FPMADD | | 10 | 82 |
| 11 | LOAD | | 3 | 85 |
| 12 | LOAD | | 3 | 88 |
| 13 | BRANCH | | 4 | 92 |
| 14 | STORE | | 5 | 97 |
| 15 | FPMADD | | 10 | 107 |
| 16 | FPMADD | | 10 | 117 |
| 17 | FPMADD | | 10 | 127 |
| 18 | FPMADD | | 10 | 137 |
| 19 | FPMADD | | 10 | 147 |
| 20 | FPMADD | | 10 | 157 |
| 21 | FPMADD | | 10 | 167 |
| 22 | FPMADD | | 10 | 177 |
| 23 | FPMADD | | 10 | 187 |
| 24 | FPMADD | | 10 | 10 |
| 25 | FPMADD | | 10 | 20 |
| 26 | FPMADD | | 10 | 30 |
| 27 | BRANCH | | 4 | 34 |
| 28 | LOAD | | 3 | 37 |
| 91 | 92 | 93 | 94 | 95 |

FIG. 9

METHOD AND APPARATUS TO ELIMINATE PROCESSOR CORE HOT SPOTS

FIELD OF THE INVENTION

The present invention relates to computer processor chips. More specifically, the present invention relates to symmetric multiprocessor (SMP) computer systems in which localized areas on the computer chips become overheated due to a large amount of uninterrupted processing activity in the localized area.

DESCRIPTION OF THE RELATED ART

Power dissipation and power density are increasingly becoming a concern in both computer systems and computer processor design. The components of the processor, such as the logic gate transistors, buses, and registers generate heat during switching activity, as capacitance of transistor gate electrodes and wiring capacitance is charged and discharged at high frequency.

A first-order approximation of power dissipation is expressed in equation (1) below:

$$P = \frac{1}{2} * C * V^2 * f \quad (1)$$

Where P is power in watts; C is capacitance in farads; V is voltage in volts; and f is frequency in Hertz. Equation (1) assumes a single switch for each cycle. Many circuits, in fact, can or do switch more than once in a cycle. Clock drivers, for example, switch in both directions every clock cycle.

A commonly used Complementary Metal Oxide Semiconductor (CMOS) circuit technique known as "domino logic" has a large percentage of the circuits used switch in each direction during each cycle. Domino logic is used where switching speed is the primary concern. In domino logic, a circuit node is precharged during a first half cycle. During a second half cycle, the circuit node may be discharged, depending on the state of inputs to an evaluation network.

Static CMOS logic is commonly used in portions of a logic chip where extreme speed is not required. Static CMOS logic is not precharged, but rather, is designed with a logic function comprised of N-channel Field Effect Transistors (NFETs) for pull-down of an output signal, and a complementary logic function comprised of P-channel Field Effect Transistors (PFETs) for pull-up of the output signal. For each state of the inputs, the output will be either pulled down by the pull-down logic function or pulled up by the complementary function. Static CMOS logic tends to dissipate less power, even though more transistors are used, and therefore, more capacitance must be charged or discharged. Static CMOS dissipates less power because, on average, static CMOS logic circuits switch far less than even once per cycle, with a switching factor of 10% to 20% being common.

Domino logic, or a variant of domino logic, because of its speed advantage, is used for those portions of the processor where speed is of utmost concern.

Power density problems are aggravated by the dramatic reduction in size of units in the processor. Considering areal reduction, for example, a Floating Point Multiply Adder (FPMADD) occupied a large number of square millimeters only a few years ago, but in current semiconductor technology this function can be placed in only a few square millimeters, and in the future will be perhaps reduced to under a square millimeter.

Several problems are encountered as areas decrease and power density increases. First, the power in these shrinking areas must be delivered over increasingly thin metal wires on the chip, normally over a Vdd power bus that carries a positive voltage supply, and a second power bus for ground. Wiring on semiconductor chips is subject to electromigration failure when high current densities are run through the wiring for long periods of time. Electromigration wearout effects increase exponentially with temperature, further exacerbating problems associated with high power densities. Other wearout mechanisms in the product also are greatly accelerated by temperature.

Conventional bulk silicon semiconductor chips are subject to local heating from areas of high power densities, even though silicon is a relatively good thermal conductor, with roughly half the thermal conductivity of aluminum. Many of today's high-speed processor chips are implemented in Silicon on Insulator (SOI) technology, in which a buried oxide layer is created underneath a thin silicon layer in which the transistors are formed. The thermal conductivity of the oxide in the buried oxide layer is approximately 100 times less conductive of heat than is silicon. Even though the buried oxide layer is relatively thin, the low thermal conductance of the layer impedes the heat flow and further contributes to formation of hot spots on an SOI semiconductor chip.

Furthermore, in specific computer programs, particularly numerically intensive computing (NIC), a large iterative sequence can reuse the same set of components such that hot spots are created in the components and subject them to overheating, damage, or accelerated wearout through electromigration or other mechanisms. The constant use of a particular set of processor components is acute in NIC processing that utilizes tight loop computing, such as a floating point multiply add loop. In a 64-bit FPMADD, the utilization of the FPMADD approaches 100% since the entire FPMADD unit is used each cycle, and the power density of the precharged domino logic in the FPMADD unit can approach 3 to 5 times the typical maximum allowable average power density of about 1 Watt/mm2.

There have been several attempts in the prior art to alleviate processor power consumption problems. One method is to simply have the processor operate at a lower clock frequency, thereby reducing performance. Another solution has been to create modes within the processor that deactivate system power to components in a computer system when not in use. The processors include power-down circuitry that controls the power delivered to functional units of the processor, and the individual units of the processors have the power cut to them when it is determined that the unit is not necessary during the current operational cycle. However, this system adds to manufacturing costs of the processor, and creates significant overhead in activating and deactivating the units of the processor to affect overall performance of the processor. Even when the ability to deactivate a unit when it is not in use is implemented, the ability to deactivate units, such as the FPMADD, is no help when the processor is making a large iterative use of the FPMADD, perhaps lasting many seconds, many minutes, or even many hours.

It is helpful to think of the problem in terms of an electric burner unit on a conventional stove. One can put his or her hand on the burner, turn the burner on briefly, and then turn it off again with no injury to the hand. However, if the burner is allowed to remain on for more than a short time, damage to the hand will occur.

Modern large computer systems have a number of processors, sharing a memory system and other resources. An operating system distributes tasks among the processors. Such a system is called a symmetric multiprocessor (SMP). The tasks being handled by such a system are usually widely varied in nature, comprising, for example, the operating system itself, a commercial workload, database queries, input/output processing, and NIC tasks. The NIC tasks are almost always the tasks that create hot spots. Other tasks statistically distribute the processing randomly enough that hot spots do not happen. NIC tasks iteratively use the high-powered FPMADD unit for extended periods of time.

Therefore, there is a need for a method and apparatus that will eliminate excessive heat buildup on processor chips in a symmetric multi-processor system.

SUMMARY OF THE INVENTION

A principle object of the present invention is to provide a method of task switching in a symmetric multi-processing (SMP) system that will determine when a heat buildup in a unit of a processor is occurring, and, respondent to that determination will move the task to a different processor in the SMP.

In an embodiment of the invention, thermal sensing is performed in or near units of the processor that are designed to have high power density when active. An operating system of the SMP is alerted when a predetermined temperature is reached in one or more of the units. Upon receiving such an alert, the operating system task switches the task to a different processor in the SMP.

In an embodiment of the invention, instruction opcodes are examined and values are produced which are related to the propensity of each instruction to cause one or more hot spots in units of the processor. The values are added to a register. The register is reset at a predetermined periodic interval. If the value in the register is found to exceed a predetermined value, an operating system of the SMP is alerted that one or more of the units is becoming too hot. Upon receiving such an alert, the operating system task switches the task to a different processor in the SMP.

In an embodiment of the invention, a task switch is preferably made to a processor having high affinity with data or other resources associated with the original task, such as in the case where several processors share one or more levels of cache memory.

In an embodiment of the invention, an operating system maintains thermal hot spot information for each processor in the system. The operating system makes use of the hot spot information when reassigning a task when a processor reports a thermal warning.

BRIEF DESCRIPTION OF THE DRAWINGS

FIG. 9 shows an example of how the Instruction Power Unit of FIG. 8 operates.

DETAILED DESCRIPTION OF THE PREFERRED EMBODIMENTS

Figure 1:
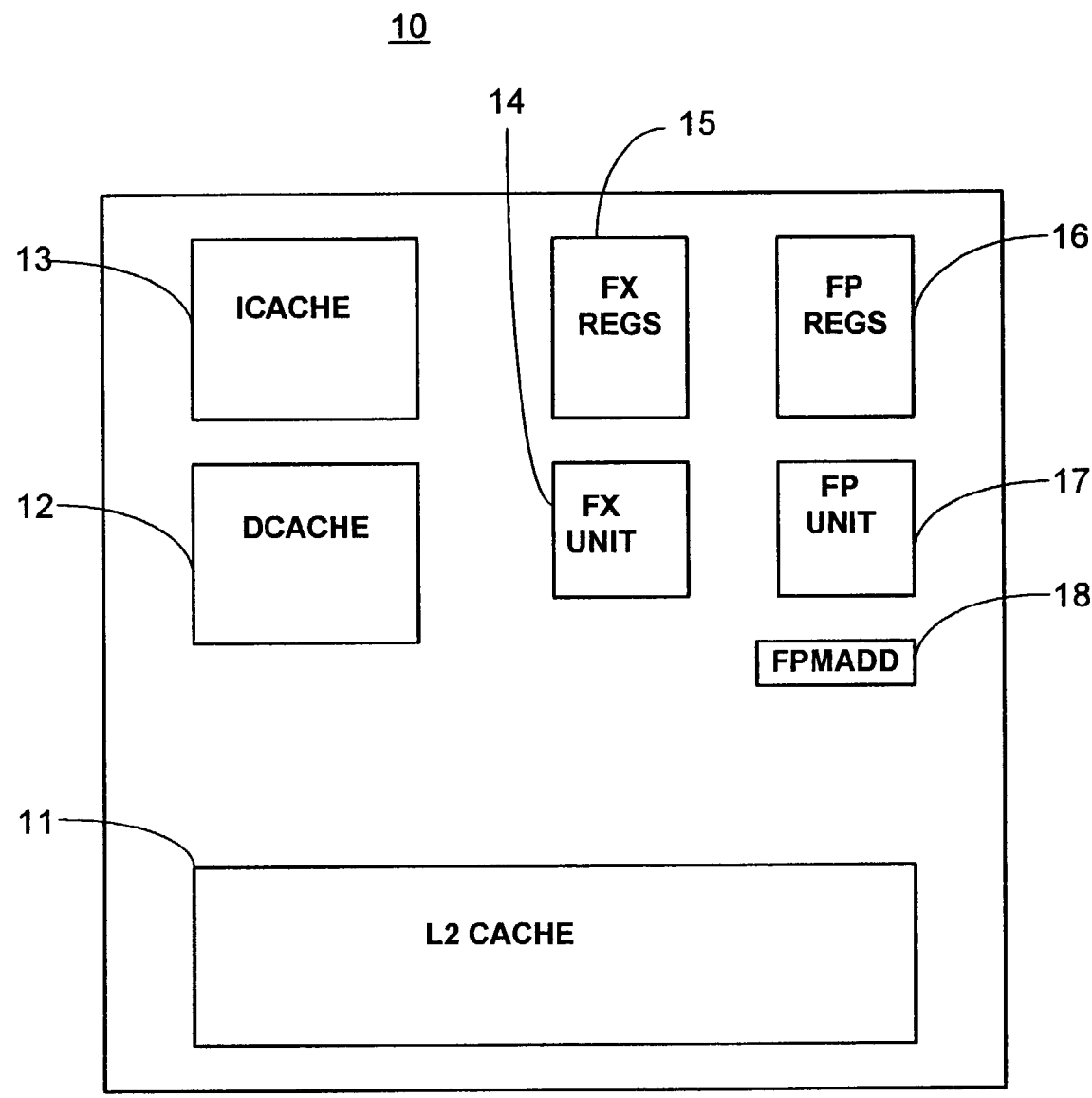
FIG. 1 shows a processor with several of the major functional units used by the processor.

Having reference now to the figures, and in particular FIG. 1, a processor 10, is shown. Processor 10 can be any processor. Examples of processors include Power4 by the International Business Machines Corporation, or Itanium by the Intel Corporation. Some of the major functional units commonly found on such processors are shown.

L2 cache 11 is one memory in a memory hierarchy common in modern processors. L2 cache 11 is commonly in the range of one megabyte (1 MB) to 16 MB, but could be of any size. L2 cache is often optimized for bandwidth, rather than for speed or density.

Icache 13 and dcache 12 represent a common implementation of the "first level cache" L1 cache in the memory hierarchy. Dcache 12 holds data that is likely to be used in the processor; icache 13 holds instructions that are likely to be used in the processor. Typical sizes for icache 13 and dcache 12 are 32,000 bytes (32 KB) to 256 KB, although larger and smaller sizes are possible. Icache 13 and dcache 12 are typically designed for low latency (how long it takes to access to the data), and make data available to functional units on processor 10 in one or two processor cycles.

Most processor 10 embodiments have a set of registers for fixed-point data, shown in FIG. 1 as FX regs 15. A fixed-point unit, FX unit 14, typically utilizes FX regs 15 for data; accessing and storing data using only references to a register number in FX regs 15, rather than memory addresses. Typically FX regs 15 comprise between 16 and 128 registers, although more or less are possible. Some modern processors have a plurality of FX unit 14, so that multiple fixed-point operations can be performed at the same time.

Most processor 10 embodiments have a set of registers for floating-point data, shown in FIG. 1 as FP regs 16. A floating-point unit, FP unit 17, typically utilizes FP regs 16 for data; accessing and storing data using only references to a register number in FP regs 16, rather than memory addresses. Typically FP regs 16 comprise between 16 and 128 registers, although more or less are possible. Some modern processors have a plurality of FP units 17, so that multiple floating-point operations can be performed at the same time.

Floating-point Multiply Add unit FPMADD 18 is a highly specialized unit that performs floating-point multiply and add functions that are frequently used in floating-point mathematics such as vector dot products. FPMADD 18 can be thought of as a resource used by FP unit 17, or can be considered to be a part of FP unit 17. FPMADD 18 is depicted separately in FIG. 1 because typical designs of FPMADD 18 dissipate very high power when the FPMADD 18 is active, the power density is often far higher than can be sustained for an extended period of time.

Figure 2:
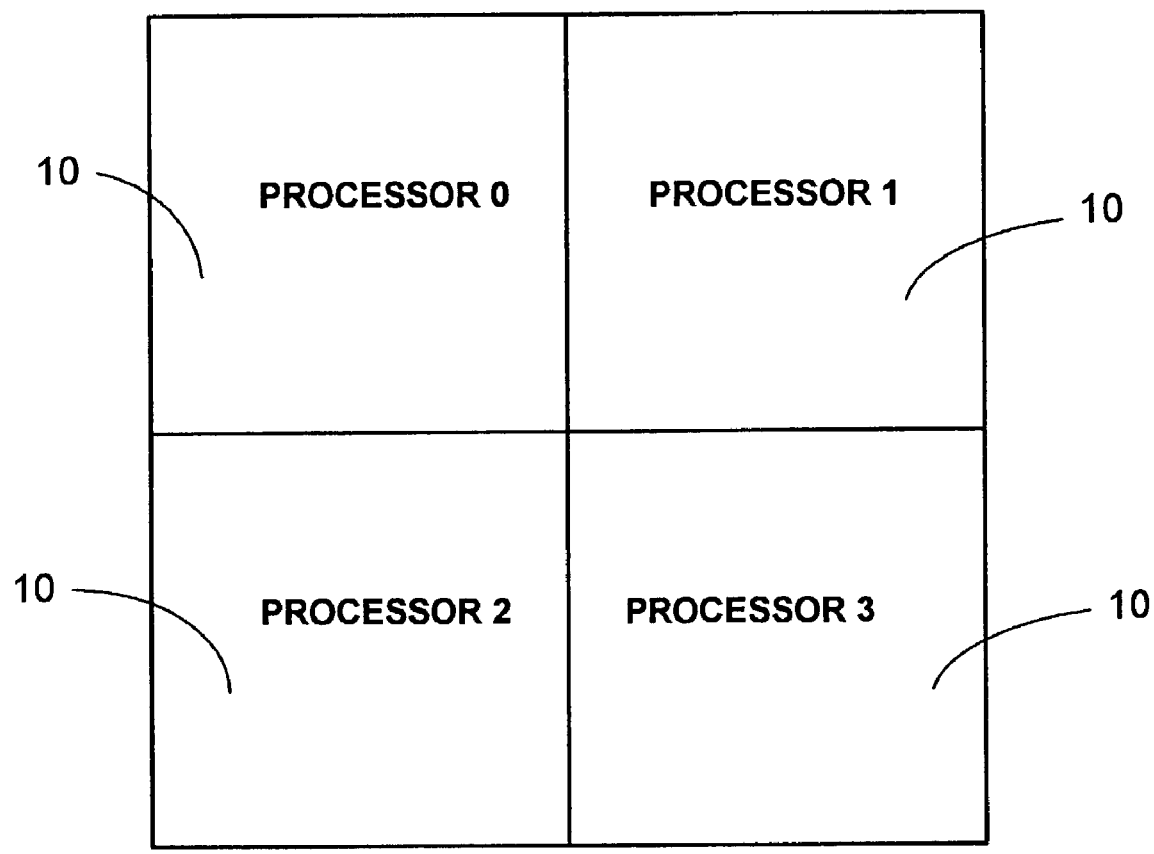
FIG. 2 shows a chip with four of the processors shown in FIG. 1 placed on the chip.

FIG. 2 shows chip 20, upon which four processors 10 have been formed. As semiconductor technology advances, and shapes are made progressively smaller with each generation, it has become possible to put multiple processors on one semiconductor chip. Advantages in doing so include faster communication between the processors sharing a chip. When processors on separate chips have to communicate, they must do so with special circuits that drive off the chip, over a signal conductor coupling one chip to the other. Such communication is slower than communication within the chip. Some modern processors, such as the IBM Power4, have two processors on a single chip, but a single L2 cache on the chip, which is shared by the two processors. Data in such a single L2 cache is quickly accessible by either processor. In the future, chips 20 with more than four processors will be designed. A four-processor chip 20 is shown in FIG. 2 as an example of multiple processors 10 being placed on a single semiconductor chip.

Figure 3:
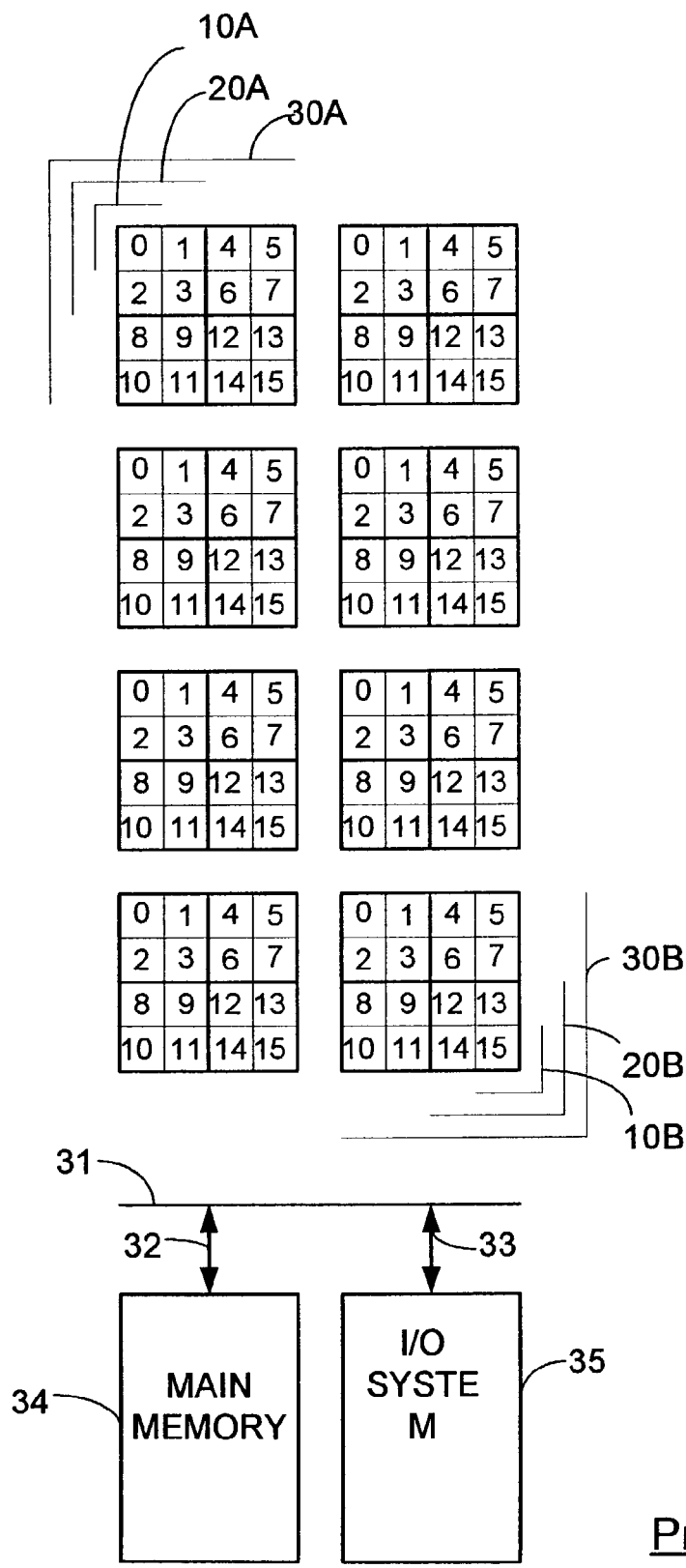
FIG. 3 shows a high level diagram of a 128-way symmetric multiprocessor (SMP).

FIG. 3 shows a high level diagram of a 128-way symmetric multiprocessor. Multichip module (MCM) 30A contains four chips 20A. Chip 20A is an instance of chip 20, and contains four processors 10, one of which is shown as processor 10A in FIG. 3. MCM 30A, of course, could also be a printed wiring board (PWB). The description of MCM 30A as a "module" is only exemplary only of one way to package the chips, eventually creating a 128-way SMP. FIG. 3 shows eight instances of the MCM. Processor 10B of chip 20B of MCM 30B is the $128^{th}$ processor in the SMP. A 128-way SMP is also only exemplary, and the number of processors in the SMP can be any number.

Communication system 31 couples the 128 processors over signals 32 to a main memory 34. Communication system 31 couples the 128 processors over signals 33 to an input/output (I/O) system 35. It will be understood by one skilled in the art that many implementations of Communication system 31, signals 32, signals 33, main memory 34, and I/O system 35 are possible, and the current invention is intended to operate with any of these possible implementations.

Each processor 10A through 10B shown can be executing a task as assigned by an operating system, or hypervisor, described later.

Figure 4:
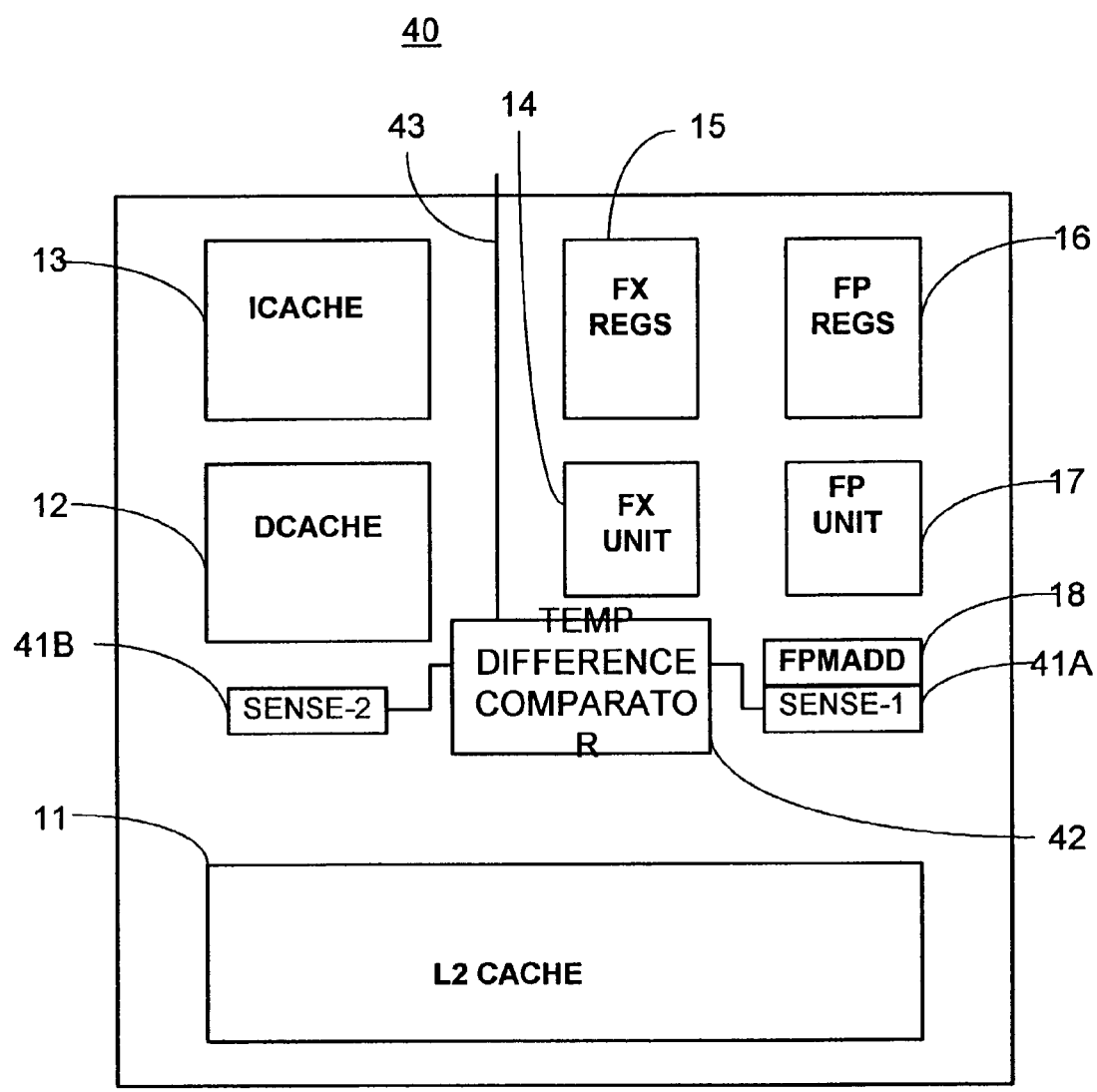
FIG. 4 shows the processor of FIG. 1 with additional function that detects a hot spot.

FIG. 4 shows a processor generally depicted as processor 40. Processor 40 is the same as processor 10, but further comprises two thermal sensors, 41A and 41B, and a temperature difference comparator (TDC) 42.

Sensor 41A is placed physically close to, or, preferably, actually within, FPMADD 18 in order to be at substantially the same temperature as FPMADD 18. Stated another way, sensor 41A must be in good thermal contact with FPMADD18. As described earlier, FPMADD 18 is often designed to have a power density that is not sustainable for long periods of time. Sensor 41B is placed at some distance away from areas on the chip which have high power densities. Cache memories typically have relatively low power densities.

TDC 42 uses information from sensors 41A and 41B and outputs a thermal warning 43 when a predetermined temperature difference is found to exist between the two sensors. Thermal warning 43 is a single signal, producing a "1" or a "0" indication that a hot spot has occurred. In another embodiment, thermal warning 43 is a plurality of signals carrying an encoded value indicative of a severity, or magnitude, of a thermal hot spot. Thermal warning 43 physically leaves processor 40 as a signal wire, or in another embodiment, as a plurality of signals. Alternatively, thermal warning 43 is stored in a register that can be queried by the operating system.

Figure 5:
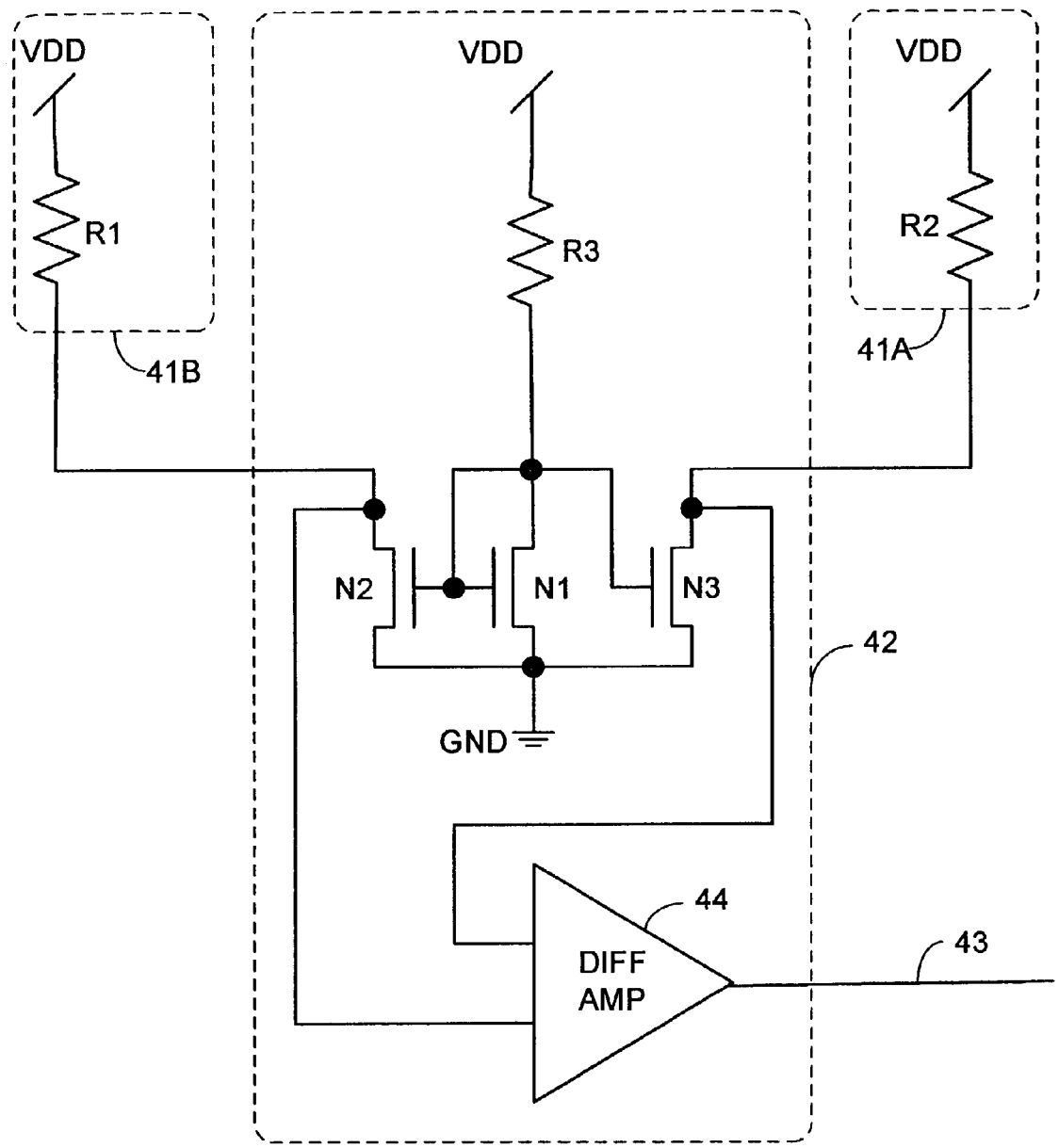
FIG. 5 shows one embodiment of a function that can detect a hot spot.

FIG. 5 shows a circuit schematic of an embodiment of thermal sensors 41A and 41B, coupled with an embodiment of TDC 42, and producing thermal warning 43. Sensors 41A and 41B are resistors, R2 and R1, respectively, constructed of material with a nonzero temperature coefficient of resistance (TCR). The normal metal wiring (aluminum or copper) on semiconductor chips is such a material and has a positive TCR such that an increase in temperature causes an increase in resistance. Many other structures or devices on a semiconductor chip also have resistive characteristics that vary with temperature and are therefore also usable for thermal sensing.

Sensor 41A is shown in FIG. 4 as being very close to FPMADD 18, and is in good thermal contact with FPMADD 18, and is at substantially the same temperature as FPMADD 18. Preferably, sensor 41A is physically within the area occupied by FPMADD. For example, if sensor 41A is constructed of the same metal used for signal wiring in FPMADD 18, R2 can be routed in unused wiring areas physically within the area occupied by FPMADD 18, and therefore made in good thermal contact with FPMADD 18. Sensor 41B is placed physically at some distance from FPMADD 18, in an area of chip 40 that does not contain units that dissipate large amounts of power in small areas. Therefore, as FPMADD 18 becomes a hot spot, R2 will increase in resistance relative to R1.

TDC 42 in FIG. 5 comprises a current mirror circuit and a differential amplifier. R3 is a current bias device, commonly a resistor. N-channel FET (NFET) N1 is coupled as a Field Effect Transistor (FET) diode, with a drain coupled to a gate. A source of N1 is coupled to a supply voltage, ground, in the example. NFETs N2 and N3 have gates coupled to the gate of N1 and sources coupled to the same supply voltage as the source of N1. In this configuration, the drain to source currents of N2 and N3 will "mirror" the current flowing from drain to source in N1, as long as the drain to source voltages of N2 and N3 are at least as much as the gate to source voltage of N2 and N3, minus an FET threshold voltage. Stated another way, the magnitude of the drain to source currents in N2 and N3 and the resistances of R1 and R2 must be designed such that N2 and N3 operate in their saturated range of operation. N1, N2, and N3 are all constructed with the same channel length and are on the same chip, and are designed to have similar characteristics. The drain to source currents of N2 and N3 will equal the drain to source current of N1 times the ratio of the widths of N2 and N3 to the width of N1. The widths of N2 and N3 are advantageously designed to be the same, therefore causing the drain to source currents of N2 and N3 to be the same.

Differential amplifier 44 in FIG. 5 is a high-gain differential amplifier that produces a first digital value on thermal warning 43 if the drain to source voltage of N3 is greater than the drain to source voltage of N2, and a second digital value on thermal warning 43 if the drain to source voltage of N3 is less than the drain to source voltage of N2.

The nominal resistance of R2 is designed to be slightly less than the nominal resistance of R1. Since the currents flowing through R1 and R2 are advantageously designed to be the same, the drain to source voltage of N3 is therefore higher than the drain to source voltage of N2 when R1 and R2 are at the same temperature. As R2 heats up relative to R1, the resistance of R2 increases relative to R1. When the resistance of R2 becomes greater than the resistance of R1, the drain to source voltage of N3 becomes less than the drain to source voltage of N2. Differential amplifier 44 will respond by changing the digital value output on thermal warning 43.

Thermal warning 43 in the embodiment described above is a single digital value. That is, either there is a hot spot or there is not. Those skilled in the art will recognize that simple modifications allow for making thermal warning 43 a multibit data word containing information about the severity of the hot spot. For example, in another embodiment, N3 is replicated, thus producing additional copies of the drain to source current of N3, one for each additional instance of N3, as outputs of TDC 42. R2 is repeated, with each instance of R2 having a slightly difference resistance value. Each instance of R2 is coupled to an instance of an N3 drain to source current output from TDC 42. High-gain differential amplifier 44 is also replicated within TDC 42. A first input of each instance of high-gain differential amplifier 44 is coupled to a separate instance of resistor R2. A second input of each instance of high-gain differential amplifier 44 is coupled to R1. The set of outputs from the instances of high-gain differential amplifiers 44 comprise a multi-bit thermal warning 43. In an example of this embodiment, with a three-bit thermal warning 43, a first bit carries a meaning that R2 is 10 degrees Centigrade (10 C) warmer than R1. A second bit carries the meaning that R2 is 20 C warmer than R1. A third bit carries the meaning that R2 is 30 C warmer than RI. The operating system (described in detail later) can then take action dependent on the severity of the hot spot.

Figure 6:
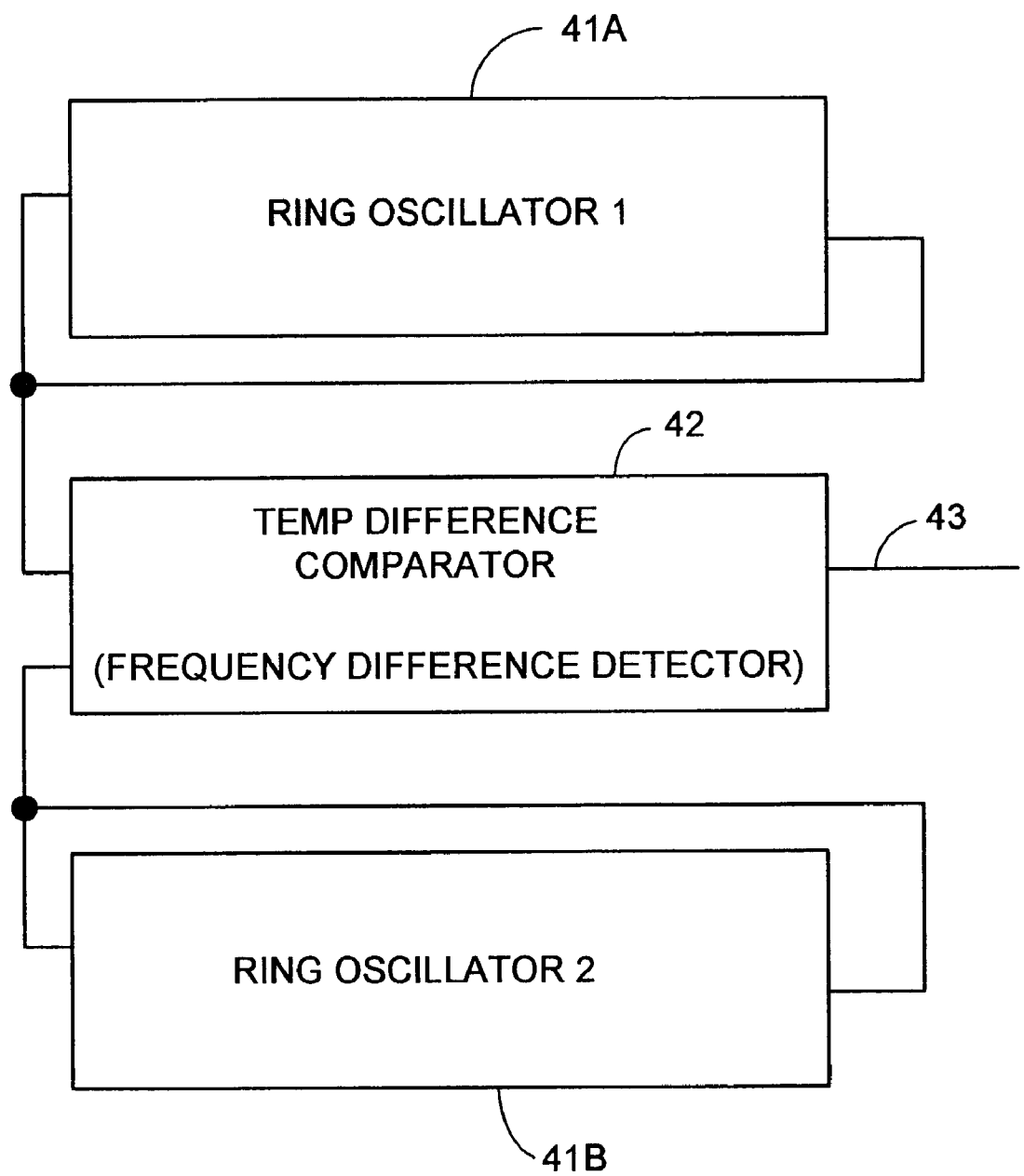
FIG. 6 shows a second embodiment of a function that can detect a hot spot.

A second embodiment of sensors 41A, 41B, and TDC 42 is seen in FIG. 6.

In FIG. 6, sensors 41A and 41B are implemented as ring oscillators ring oscillator 1 and ring oscillator 2, constructed with Complementary Metal Oxide Semiconductor (CMOS) logic circuits such as static inverters, static NANDs, and static NORs. CMOS circuits slow down as temperature increases. Sensor 41A is physically near FPMADD 18 and therefore will have a frequency that decreases relative to sensor 41B, which is further away, as FPMADD 18 becomes hotter. The frequency difference detector embodiment of TDC 42 will respond to a sufficient change in sensor 41A's frequency relative to the frequency of sensor 41B and change the digital value of thermal warning 43 when the sufficient change occurs, signaling that FPMADD has become a hot spot. A number of embodiments of the frequency difference detector version of TDC 42 are possible and all are within the spirit and scope of this invention. For example, a first counter in TDC 42 can be periodically initialized and increment at each cycle of sensor 41A (ring oscillator 1). A second counter in TDC 42 can be initialized at the same times that the first counter is initialized, and increment at each cycle of sensor 41B (ring oscillator 2). After a predetermined time following an initialization, the values of the first counter and the second counter can be compared, with the comparison determining whether ring oscillator 1 or ring oscillator 2 is of higher frequency, and how large the frequency difference is. When the difference in frequency reaches a predetermined value, thermal warning 43 is activated. As in the above discussion, thermal warning 43 can be stored in a register that is periodically sampled by the operating system, or can be a signal that interrupts the operating system. It will be appreciated by those skilled in the art that thermal warning 43 could be the actual difference in frequencies as determined by the frequency difference detector embodiment of TDC 42. Embodiment of thermal warning 43 as the actual difference in frequencies provides the operating system (described later) with the severity of the hot spot.

Figure 7:
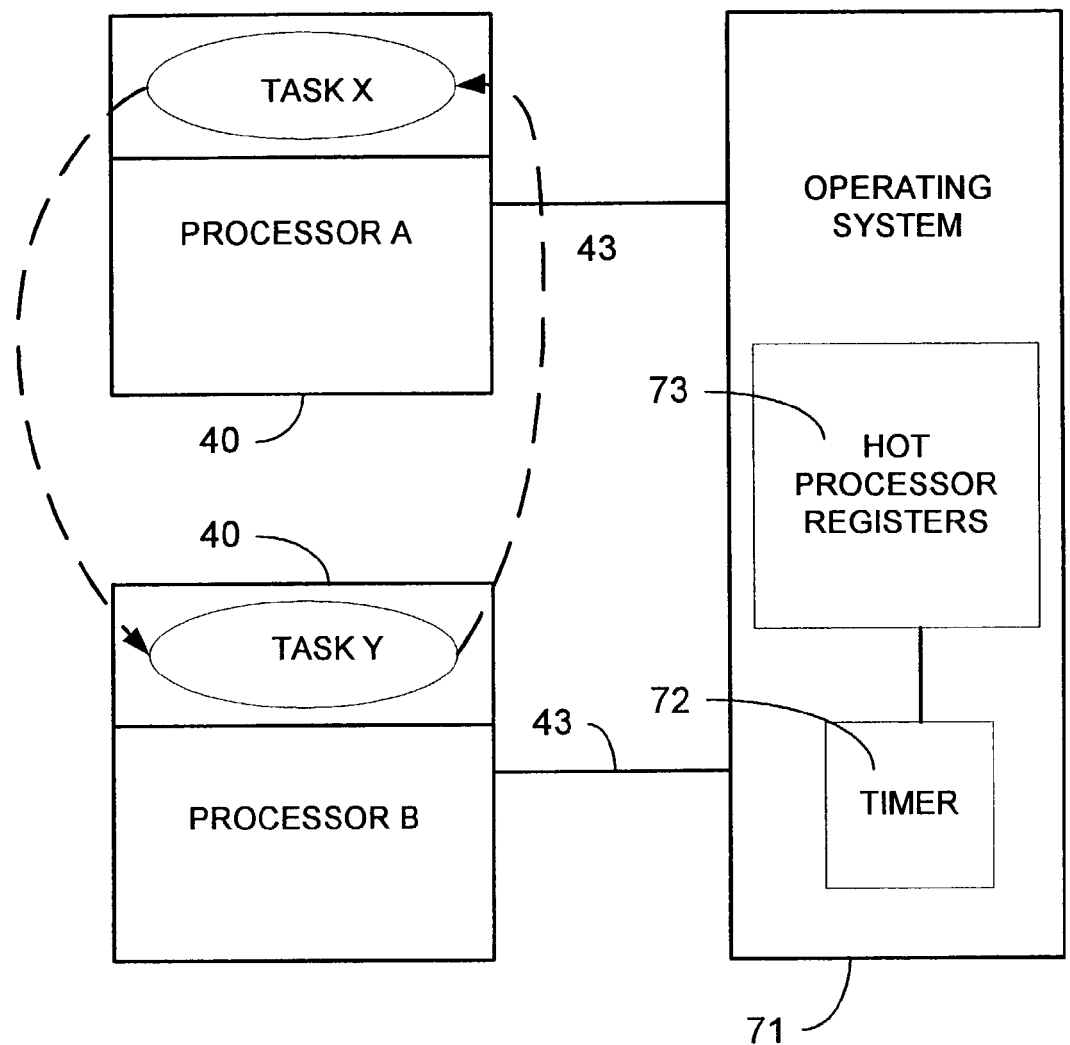
FIG. 7 shows a high level diagram of two processors in communication with an operating system. The operating system is shown swapping tasks between the two processors respondent to detection of a hot spot.

FIG. 7 is a block diagram showing two instances of processors 40 in an SMP system. The two processors 40 are in communication with an operating system 71, sometimes also called a hypervisor. In particular, thermal warning 43 from each processor 40 is made available to the operating system 71. Task X runs on processor A. Task Y runs on processor B.

Assume that task X is a NIC application, and is iteratively utilizing FPMADD 18 on processor A. Task Y is a commercial application, and is processing database queries. Because FPMADD 18 has a power density higher that can be sustained, thermal warning 43 from processor A is activated when FPMADD 18 becomes too hot. Operating system 71 is thus aware that processor A has detected a hot spot. Processor B, however does not have a hot spot, and thermal warning 43 from processor B is inactive. Operating system 71 therefore swaps task X from processor A to processor B and task Y from processor B to processor A. Moving tasks from one processor in an SMP to another processor in the SMP is a routine capability of an SMP operating system, however, doing so in response to detection of a hot spot is novel.

The task swapping between two processors can be made more intelligent if operating system 71 keeps track of processors 40 with affinity for the same data. As discussed above, some chips have multiple processors that share at least one level of cache. If one of the processors on such a chip develops a hot spot but a second processor on the chip does not have a hot spot, task swapping between the two processors on the chip reduces data transfer that would be needed if the task on the processor with the hot spot were to be moved to a processor with less or no affinity with the data being used by the task.

Overhead of task swapping can also be reduced if operating system 71 simply moves a task that has created a hot spot on a processor to an idle processor. This would simply result in a task switch, where only one task is moved, rather than a task swap, where two tasks are moved.

Once a hot spot has occurred on a processor, it is advantageous to not assign a task known to cause hot spots to that processor again for some period of time, the duration of which depends upon the technology and the cooling environment of the SMP. The hot spot has accelerated wearout mechanisms in, and perhaps near, the hot spot. Electromigration, as discussed earlier, is just one wearout mechanism that is accelerated by temperature. Allowing a processor that has suffered a hot spot to be idle, or at least to run tasks that do not cause hot spots, for as long as possible, minimizes the wearout effects on that processor.

FIG. 7 shows operating system 71 having hot processor registers (HPR) 73, which store information about which processors in the SMP have reported hot spots, and when the hot spots occurred. A timer 72 can be used to "time stamp" when a hot spot has been reported. The operating system can use the information regarding which processors have reported hot spots and when the hot spots occurred to move a task that has caused a hot spot to a processor that has not reported a hot spot for a long period of time. A flow chart showing such a process will be discussed later.

The previous means of detecting hot spots utilized direct measurements of temperature with a sensor near a potential hot spot being compared to a sensor that is thermally remote from the hot spot.

Figure 8:
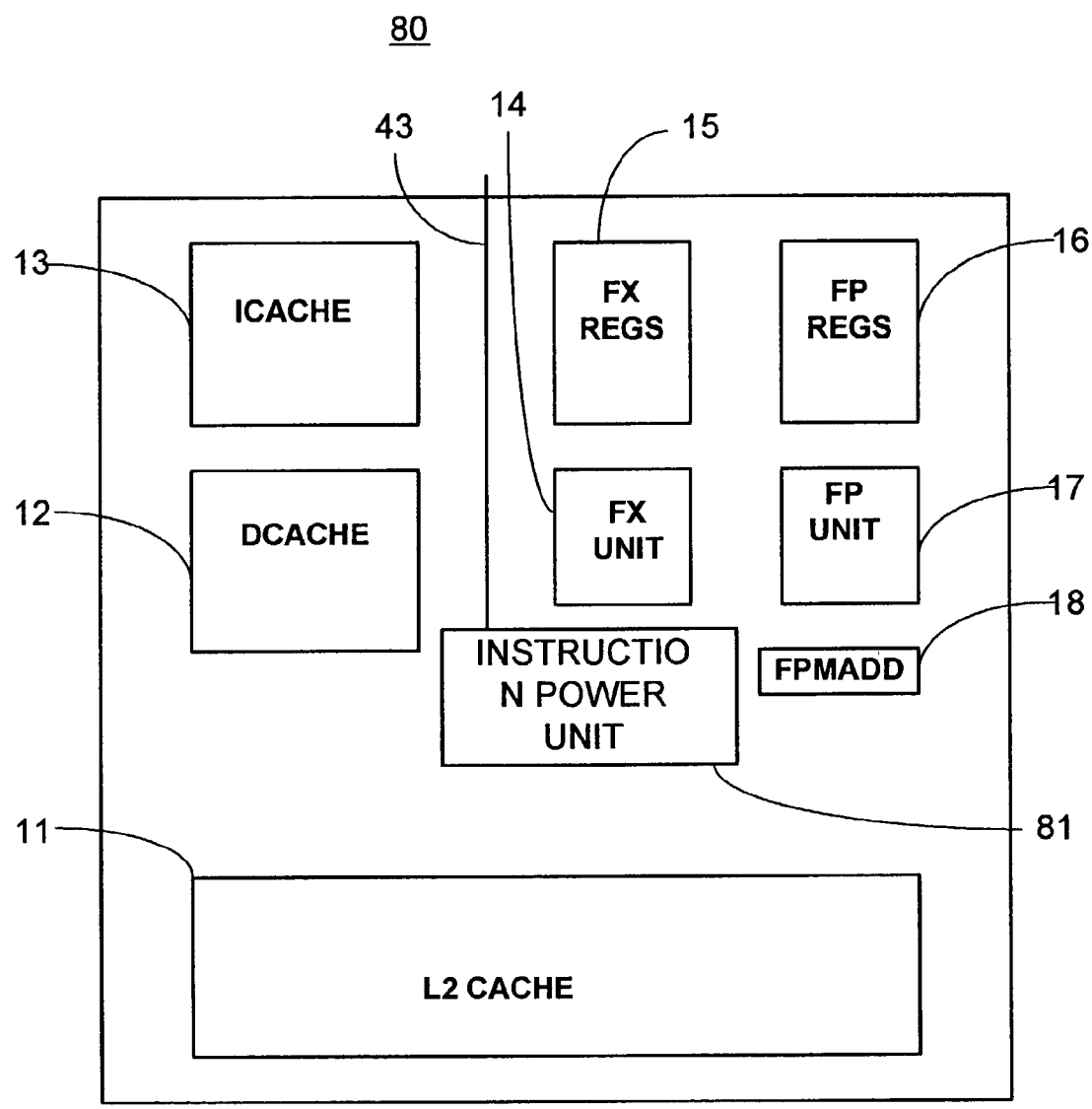
FIG. 8 shows the processor of FIG. 1 with a different mechanism for detection of hot spots. An Instruction Power Unit (IPU) is shown as the component that detects hot spots.

FIG. 8 shows processor 80, which is similar to processor 40, but without sensors 41A and 41B, and also without TCU 42, but with an instruction power unit (IPU) 81, which drives thermal warning 43. IPU 81 examines instruction opcodes, relates each opcode to a magnitude of power that instruction will dissipate in a potential hot spot, and will activate thermal warning 43 when enough power over a predetermined amount of time has been dissipated. The following discussion describes IPU 81 in detail. Both IPU 81 on processor 80 and the sensing system comprising sensors 41A, 41B, and TCU 42 in processor 40 are examples of detectors that can detect hot spots on a processor.

FIG. 9 shows one embodiment of how IPU 81 can detect a hot spot. Processor 80 executes a stream of instructions, a portion of which is shown in table 91 that simply numbers the instructions executed. Modern processors typically execute a billion instructions per second, and the rate of executing instructions has been increasing rapidly. Only a sequence of 28 instructions is shown, for simplicity and brevity, in the example in FIG. 9. The actual instruction executed for each instruction number is shown in table 92. A load instruction loads data from memory. A store instruction stores data to memory. A FPMADD executes a floating point multiply add in FPMADD 18. A branch instruction transfers program control to another point in the program being executed. Modern processors typically have over a hundred instruction types that they are capable of executing, but the load, store, FPMADD, and branch serve as exemplary instructions.

Power Token Generator 93 maps each instruction into a power token value. Table 94 shows exemplary power tokens that have been created by power token generator (PTG) 93 for each instruction. PTG 93 can be embodied with standard logic blocks, with a read only memory (ROM), with a programmable logic array (PLA) or any other means for relating the bit pattern of the opcode of an instruction to a power token for that instruction. The power tokens are simply numbers that are indicative of the propensity of each instruction to cause a hot spot. For example, a power token could be the power used by an instruction divided by the area of the unit that executes the instruction. Such a power token would be a measure of power density. Any power token suitable for estimating hot spots is within the spirit and scope of the current invention.

In FIG. 9, for example, instruction 1 of table 91 is a load instruction. PTG 93 produces the corresponding power token of 3 in power token table 94.

Instruction 3 in table 91 is a FPMADD instruction. PTG 93 produces the corresponding power token of 10 in power token table 94.

No instruction, executed once, or even several times, will cause a hot spot. A hot spot, as explained earlier, results when an instruction that causes a high power density is repeatedly executed long enough that an undesirable temperature rise occurs in an area of the processor, creating a hot spot.

In the example of FIG. 9, as instructions are executed, the power token for each instruction is summed, as shown in table 95, with the sum being reset at a predefined frequency. If the sum reaches a predetermined value, a hot spot has been created. In the example of FIG. 9, the sum has been reset between instruction 23 and instruction 24. During the intervals between resets, the power tokens, advantageously proportional to power density are thus summed over the length of the intervals. Power density multiplied by time determines temperature, for a given material and cooling structure.

Figure 10:
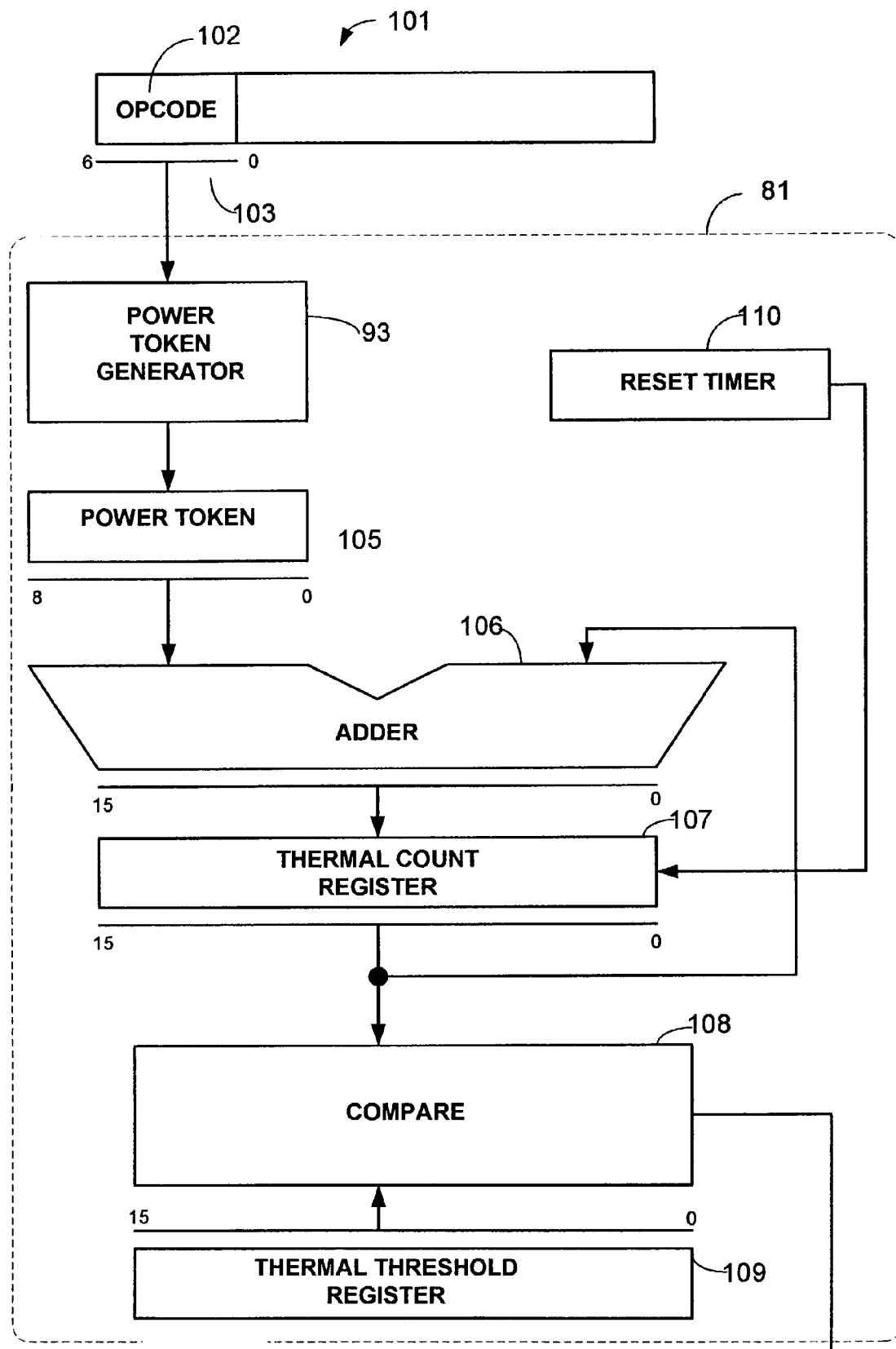
FIG. 10 shows a block diagram of an embodiment of the Instruction Power Unit of FIG. 8.

FIG. 10 is a block diagram showing an embodiment of the processing example of FIG. 9.

Processor 80 is executing an instruction 101. Opcode 102 is a subset of instruction 101, bits 0–6 in the example. The opcode is coupled to PTG 93 in IPU 81 by signals 103. PTG 93 produces a power token as described earlier which is stored temporarily in power token register 105. The number of bits in the power token, in general, is not the same number of bits in the opcode. Furthermore, instruction 101 could be either the actual instruction as held in main memory, or a decoded version of such an actual instruction. Modern processors often pre-decode instructions prior to executing them. The spirit and scope of this invention include use of an opcode from either an undecoded instruction or a decoded instruction.

The value in power token register 105 is coupled to adder 106, and is added to the current value of thermal count register 107. Thermal count register 107 is an accumulator that stores a sum of power tokens produced by PTG 93 as instructions are executed by the processor.

If the value in thermal count register 107 exceeds a value in thermal threshold register 109, comparator 108 activates thermal warning 43.

Figure 15:
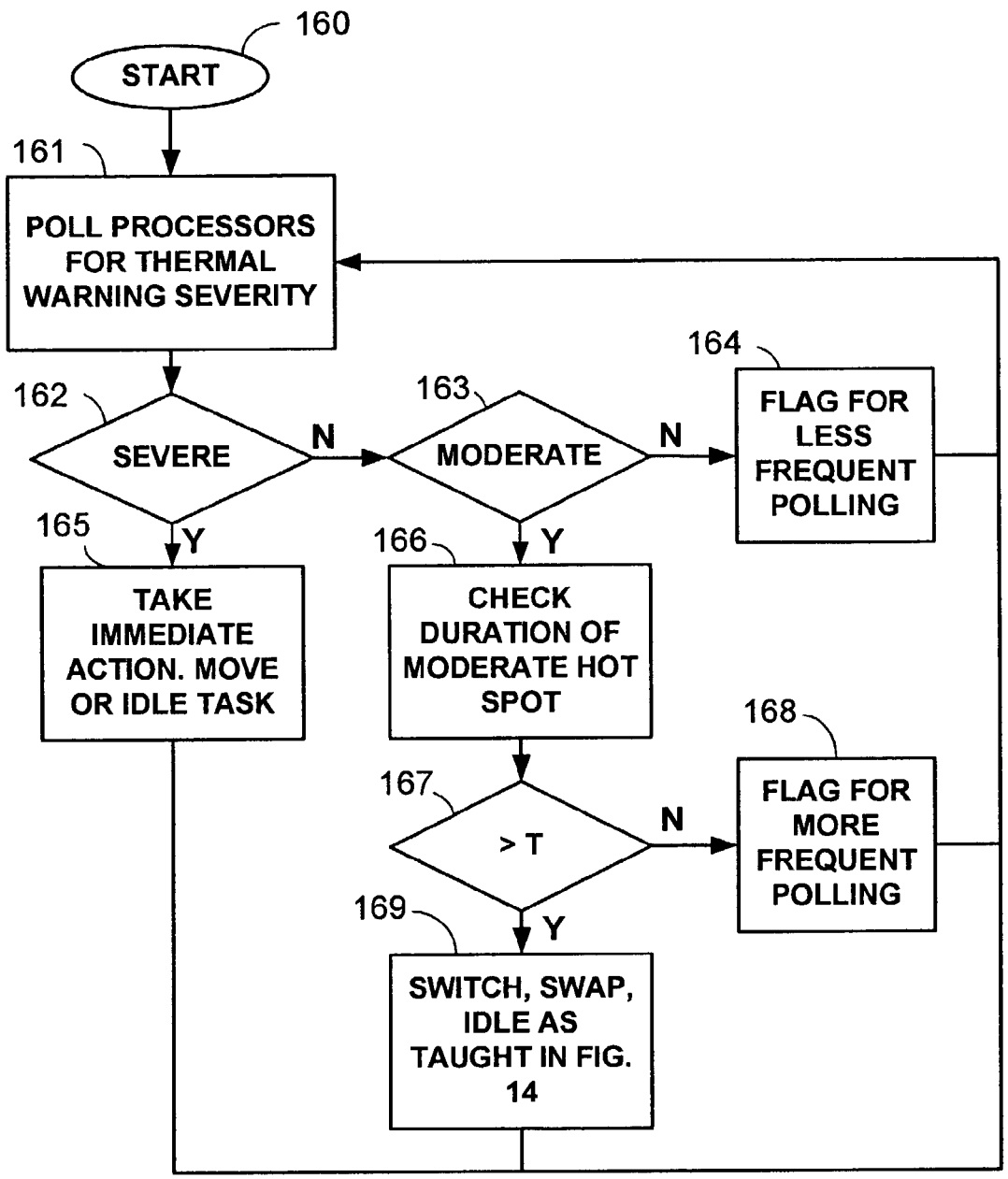
FIG. 15 shows an exemplary flowchart used by the operating system to poll processors and take action dependent on the severity of a hot spot.

Reset timer 110 periodically resets thermal count register 107. Although power tokens are advantageously positive values, and thermal count register is advantageously reset to zero by reset timer 110, those skilled in the art will appreciate that negative numbers could also be used, with reset timer resetting thermal count register to a positive number. In such an embodiment, thermal count register would have a value that is reduced by each power token until the value in thermal threshold register is reached. In such an embodiment, thermal warning 43 could simply be activated when the value in thermal count register becomes negative. Those skilled in the art will understand that many variations of the accumulation of power token values, examination of the accumulation, and activation of thermal warning 43 are possible, and such variations are within the spirit and scope of the current invention. For example, in an embodiment, the value in thermal count register could be made available to the operating system (described later) as thermal warning 43, such that the operating system receives information on severity of the hot spot. The operating system, armed with such information, could take different actions depending on severity of the hot spot, as will be described later. In yet another embodiment, thermal warning 43 could be a single bit that interrupts the operating system (described later) or which is periodically checked by the operating system. When the single bit thermal warning 43 is activated, the operating system would then examine the details of the severity of the hot spot in more detail, such as reading the contents of thermal count register 107 and taking appropriate action. FIG. 15 shows an example of actions that can be taken and will be described later.

The function within box 81 is an embodiment of IPU 81, and, as shown in FIG. 10 includes all the logic functions required to examine opcodes, and to produce a thermal warning when a hot spot has been created by execution of too many instructions in a predetermined time that cause high power density during that time.

Figure 11:
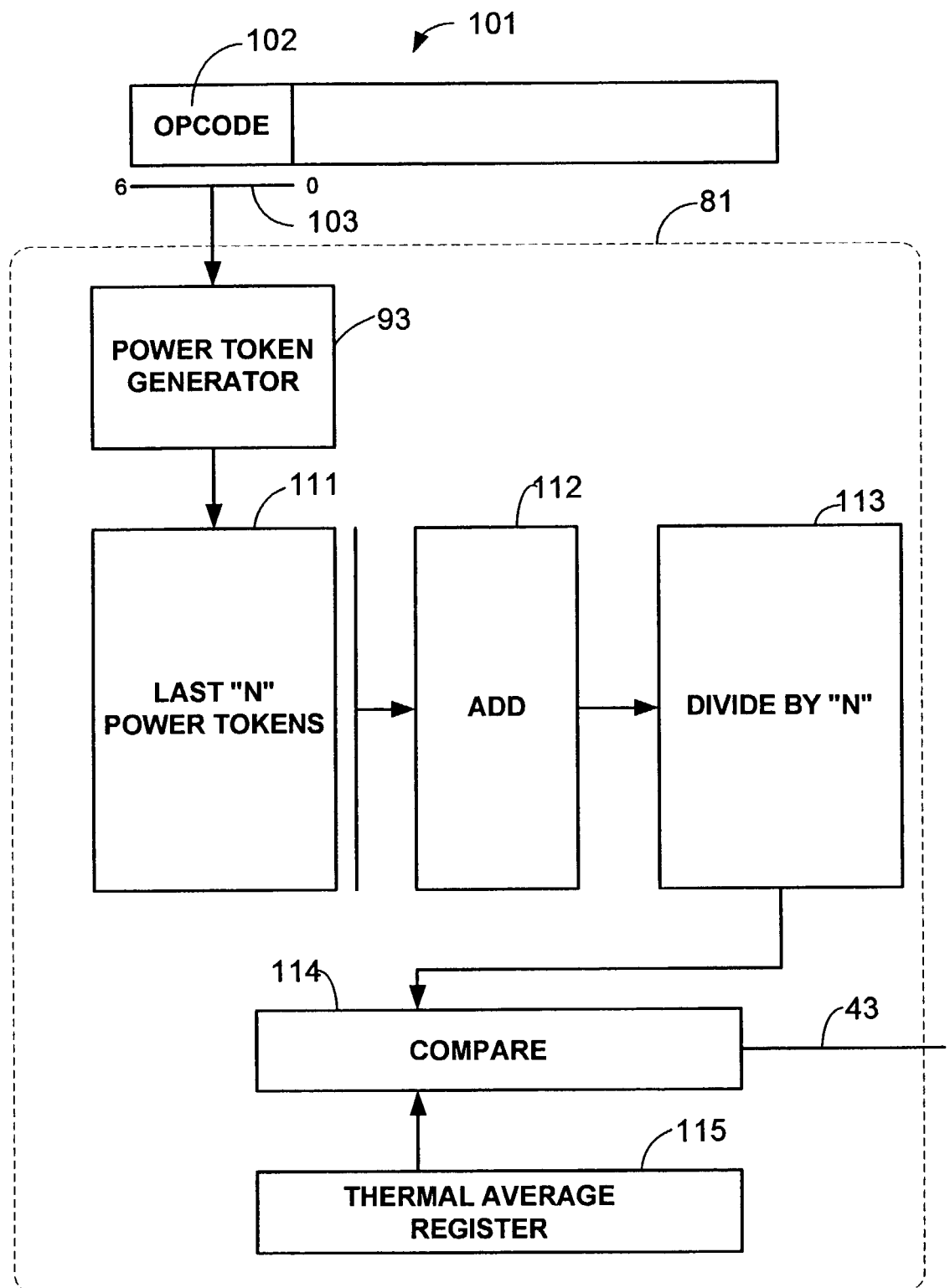
FIG. 11 shows a block diagram of a second embodiment of the Instruction Power Unit of FIG. 8.

FIG. 11 is similar to FIG. 10, but has a different embodiment of IPU 81.

Power token generator 93 in FIG. 11 is exactly the same as the power token generator in FIG. 10, producing a power token value for each opcode 102 descriptive of the power density that opcode produces when executed. The power tokens are stored in a last "N" power tokens (LNPTR) register bank 111. Adder 112 produces a sum of the last "N" power tokens. Divide unit 113 divides the sum by "N", producing a value that is the average power token value for the last N opcodes. N is chosen to be a large enough number to represent how long it would take for an undesirable temperature buildup to occur. Thermal average register 115 contains a threshold value for the average power token value as calculated above. Comparator 114 tests the average power token value output by divide unit 113 against the value in thermal average register 115. If the average power token value exceeds the value in thermal average register 115, thermal warning 43 is activated. As in previous embodiments wherein thermal warning 43 is a multi-bit word, the actual value of the average power token value output by divide unit 113 is used as thermal warning 43, thus making available to the operating system (described later) the severity of the hot spot. In an alternative embodiment, thermal warning 43 is a single bit signal with interrupts or is polled by an operating system (described later). When the single bit thermal warning 43 is activated, the operating system would then examine the details of the severity of the hot spot in more detail, such as reading the contents of the output of divide by "N" 113 and taking appropriate action. FIG. 15 shows an example of actions that can be taken and will be described later.

Modern processors often execute more than one instruction per cycle.

Figure 12:
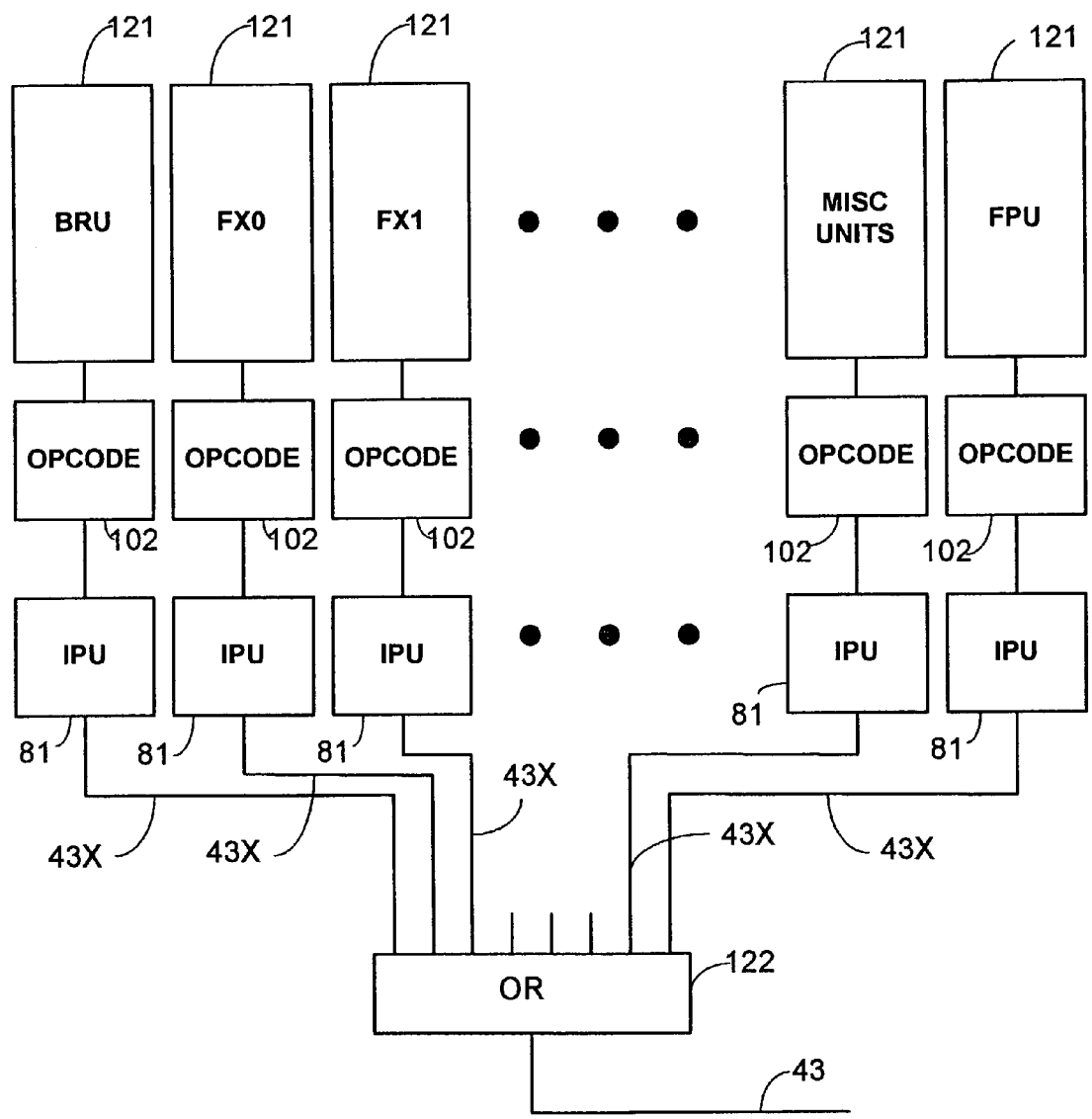
FIG. 12 shows a block diagram illustrating how more than one potential hot spot on a processor can be examined and reported.

FIG. 12 depicts a processor in which a number of opcodes 102 are being executed concurrently by a number of functional units 121 on the processor. The BRU is a branch unit. FX0 and FX1 are fixed-point units, FPU is a floating-point unit, and Misc Units is used to represent other functional units. Further instances of these, or other, functional units are represented by the dots.

In the example of FIG. 12, an IPU 81 examines the opcodes 102 for the unit coupled to the opcode and drives a local thermal warning signal 43X. All the 43X signals are logically OR'ed by OR circuit 122, which then produces thermal warning 43. As an alternative, all the 43X signals could be stored in a register to be examined by operating system 71. Although such detail might be interesting, the operating system would need to do a task switch or task swap if any of the units encounter a hot spot, so, for simplicity, a preferred embodiment is to OR the 43X signals.

Figure 13:
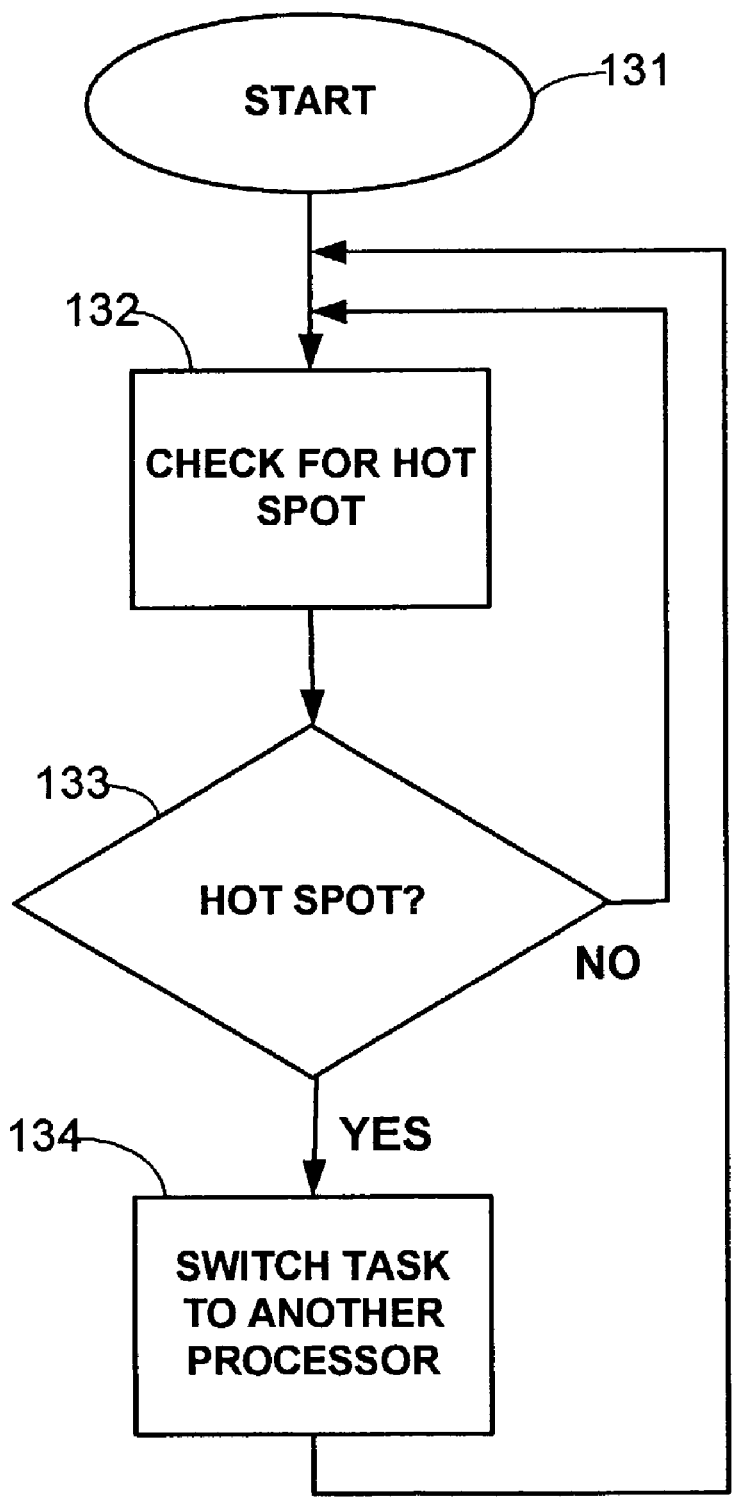
FIG. 13 shows a high level flowchart of an operating system using the invention.

FIG. 13 shows a high-level flow chart that operating system 71 follows according to the current invention.

Start 131 is simply the start of the process. Registers are initialized during start 131.

In step 132, operating system 71 checks for a hot spot. This checking can be by any means, for example, by watching interrupts triggered by thermal warning 43 signals. Alternatively, operating system 71 could periodically query registers containing thermal warning 43 signals.

In step 133, if no hot spot was detected in step 132, control is passed back to step 132. If a hot spot was detected by step 132, control passes to step 134. Step 134 does a task switch of the task that created the hot spot to another processor in the SMP, or does a task swap with another processor in the SMP.

Figure 14:
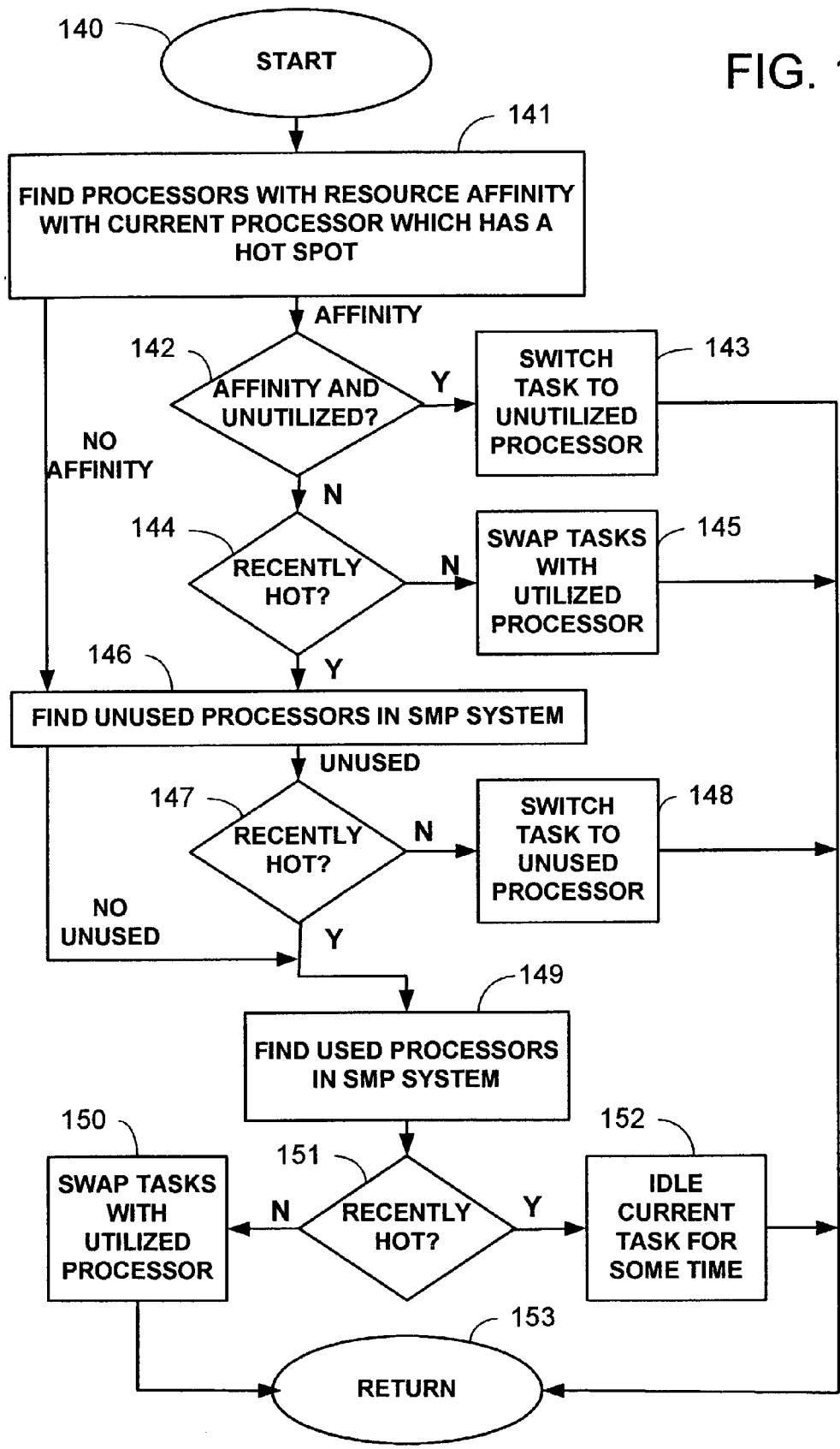
FIG. 14 shows an exemplary flowchart used by the operating system to make task switching or task swapping decisions.

FIG. 14 provides a detailed flowchart by which operating system 71 can intelligently perform the task switch or task swap of step 134 in FIG. 13.

Step 140 is the starting point of this process, which is executed when a hot spot has been detected on one of the processors (hereinafter called the instant processor) in the SMP.

Step 141 finds processors with resource affinity with the instant processor reporting a hot spot. Resource affinity with another processor means that less data would have to be moved in a task swap or a task switch to that processor, especially over module signal wires or PWB wires, versus the amount of data that would have to be moved in a task swap or task switch with a processor having less or no data affinity. For example, two processors on a single chip would have high data affinity versus two processors on separate MCMs. Degree of data affinity can vary depending on the particular implementation of an SMP, but invariably, task swapping between some processors is more efficient than task swapping between some other processors. If affinity is found, step 141 passes control to step 142; otherwise, step 141 passes control to step 146.

Step 142 checks if there is a processor with high resource affinity to the instant processor and is unutilized. If so, operating system 71 switches the task from the instant processor to the processor found to have high resource affinity and which is unutilized.

If step 142 finds a set of processors with high affinity but which are unutilized, in step 144, operating system 71 checks hot processor registers 73 to determine if any of the set is a candidate for a task swap. The most desirable candidate in the set would be the one that has gone the longest without encountering a hot spot, as described earlier. If such a candidate is found, in step 145, operating system 71 performs a task swap between the instant processor and the selected candidate processor. If each processor in the set has recently encountered a hot spot, step 144 transfers control to step 146.

Step 146 receives control if no processors are found with affinity to the instant processor, or, if all processors with affinity have recently also reported hot spots, as described above. Step 146 looks at the remaining processors in the SMP system to find a set of processors that are unused. If step 146 finds unused processors, in step 147, operating system checks hot processor registers 73, as above, to find the most desirable candidate to switch the task on the instant processor to. Step 148 then performs the task switch. If no candidates are found, step 147 passes control to step 149. If step 146 does not find any unused processors in the SMP, control is passed from step 146 to step 149.

Step 149 considers the used processors in the SMP system and provides a list of those processors to step 151.

Step 151 checks hot processor registers 73, as above, to find the most desirable processor with which to swap tasks with the instant processor. As above, the most desirable processor is the one with the longest interval since a hot spot was detected. If no candidate processor is found, control passes to step 152. If a candidate processor is found, control passes to step 150, where the task on the instant processor is swapped with the task on the candidate processor.

Step 152 is entered from step 151. The only time step 152 is entered is when a hot spot is encountered in the instant processor and all other processors are also unavailable for a task switch or task swap because of recent hot spots of their own. In step 152, therefore, operating system 71 simply idles the task on the instant processor for some predetermined time period. The act of idling the task could mean running it at a slower frequency for the time period, or stopping it entirely for the time period.

Upon completion, steps 143, 145, 148, 150, and 152 all transfer control to step 153, which ends the process of task switching or task swapping shown at a high level in step 134 of FIG. 13.

FIG. 15 shows a flow chart of steps taken by operating system 71 in embodiments in which thermal warning 43 contains a digital word containing severity of a hot spot. Such embodiments are useful in that operating system 71 can take action even before a severe hot spot has developed. Such actions include examining thermal warning 43 more frequently on a processor that has a moderate hot spot. Such actions also include not moving the task on the processor reporting the moderate hot spot unless the moderate hot spot persists for some predetermined time period. Another such action that processor 71 performs include examining the thermal warning more frequently on processors reporting moderate hot spots, and less frequently on processors where not even a moderate hot spot has been detected.

In the process of FIG. 15, step 160 begins the process and passes control to step 161. Step 161 iterates through a list (not shown) of processors, in which operating system 71 examines thermal warnings 43 from each processor in the list.

In step 162, if an instant processor is found with a severe hot spot, control passes to step 165, wherein operating system 71 takes immediate action, such as is taught in the process of FIG. 14. If the instant processor does not have a severe hot spot, control passes to step 163.

Step 163 checks the instant processor for existence of a moderate hot spot. A moderate hot spot means that no immediate danger of severe damage or extreme wearout acceleration exists, but that some undesirable elevation of temperature exists, and the task running on the instant processor should be switched, swapped, or idled, if it persists, in order to improve reliability of the SMP. If a moderate hot spot is detected on the instant processor, control passes to step 166; if not, control passes to step 164.

Step 164 is an optional step in the example. Step 164 is reached when an instant processor reports that there is no detection of even a moderate hot spot. There may be efficiencies available if the instant processor is polled less frequently. It is likely that if the instant processor is running very cool that it is unutilized, or perhaps running a task that does not produce hot spots. Operating system 71, in step 164, flags the instant processor for less frequent polling, thus freeing operating system 71 to use its resources more efficiently, perhaps by polling other processors more often.

Step 166 is reached when an instant processor has reported a moderate hot spot. A moderate hot spot, as described above, is not an emergency, but should be watched for persistence. Operating system 71 checks duration of the moderate hot spot in hot processor registers 73 and passes control to step 167.

Step 167 checks if the instant processor's moderate hot spot has persisted beyond some predetermined time, T. If so, control passes to step 169, in which operating system 71 performs a task switch, task swap, or idles the task for a period of time, as taught in FIG. 14. If not, control passes to step 168. Step 168 is an optional step, and flags the instant processor for more frequent polling by operating system 71.

Steps 164, 165, 168, and 169 return control back to step 161 which continues the polling process.

In a further embodiment, which is interrupt driven, step 161 is a step that waits for interrupts. Such interrupts would be single signal thermal warning 43 signals becoming active. Step 161 in this embodiment determines, using well-known interrupt handling techniques, the instant processor that has activated its thermal warning 43. Operating system 71 then queries the instant processor for information about the severity of the hot spot, as taught in the discussion earlier. Knowing the severity of the hot spot, the remainder of the flowchart of FIG. 15 is followed. Optional steps 164 and 168 are eliminated, as they pertain only to a polling embodiment.

As described in detail above, aspects of the preferred embodiment pertain to specific method steps implementable on computer systems. In an alternative embodiment, the invention may be implemented on computer systems having suitable detectors that generate the thermal warnings 43. The implementation for carrying out the steps in the method may be a computer program product. The programs of the program product define the functions of the preferred embodiment and may be delivered to a computer via a variety of media, which include, but are not limited to (a) information permanently stored on a non-writable storage media (e.g., read-only memory devices such as CD-ROM disks readable by CD-ROM drive); (b) alterable information stored on writable storage media (e.g., floppy disks that can be read or written by a diskette drive, or a hard disk in a hard disk drive); or (c) stored on transmission media such as information conveyed to a computer by a communication medium, such as through a computer or telephone network, including wireless communications. Such media, when carrying computer-readable instructions that direct the functions of the present invention, represent alternative embodiments of the present invention.

While the present invention has been described with reference to the details of the embodiments of the invention shown in the drawings, these details are not intended to limit the scope of the invention as claimed in the appended claims.

What is claimed is:

1. A symmetric multiprocessor computer system comprising:
   a plurality of processors;
   an operating system capable of switching and swapping tasks among the processors;
   a detector to detect occurrence of hot spots in the plurality of processors;
   wherein the operating system responds to the detection of a hot spot on a first processor by switching or swapping a task from the first processor to a second processor in the plurality of processors;
   wherein the detector is capable of measuring temperature differences between physically separate areas within one or more of the processors in the plurality of processors;
   wherein the detector utilizes a pattern of instructions executed over a predetermined time interval to identify the one or more hot spots; and
   wherein the detector comprises:
   a power token generator that utilizes an opcode of an instruction and produces a power token;
   an accumulator that sums the power tokens;
   a reset timer that resets the accumulator at predetermined intervals; and
   a comparator that changes the digital value of a thermal warning if the value in the accumulator exceeds a predetermined value;

wherein each power token is a predetermined value for the power or power density of the associated opcode.

2. A symmetric multiprocessor computer system comprising:
- a plurality of processors;
- an operating system capable of switching and swapping tasks among the processors;
- a detector to detect occurrence of hot spots in the plurality of processors;
- wherein the operating system responds to the detection of a hot spot on a first processor by switching or swapping a task from the first processor to a second processor in the plurality of processors;
- wherein the detector is capable of measuring temperature differences between physically separate areas within one or more of the processors in the plurality of processors;
- wherein the detector utilizes a pattern of instructions executed over a predetermined time interval to identify the one or more hot spots; and
- wherein the detector comprises:
  - a power token generator that utilizes an opcode of an instruction and produces a power token;
  - an averager that produces an average of a last N power tokens; and
  - a comparator that changes the digital value of a thermal warning if the average of the last N power token exceeds a predetermined value;
- wherein each power token is a predetermined value for the power or power density of the associated opcode.

3. A method of improving reliability in a symmetric multiprocessor computer system comprising the steps of:
- checking for a hot spot occurring on one or more processors in the symmetric multiprocessor computer system; and
- if a hot spot is detected on an instant processor in the symmetric multiprocessor computer system, moving a task executing on the instant processor to one of a number of candidate processors in the symmetric multiprocessor computer system;
- wherein the step of moving the task executing on the instant processor to one of a number of candidate processors further comprises the steps of:
  - determining which candidate processors have data affinity with the instant processor;
  - determining which candidate processors with data affinity with the instant processor are unutilized;
  - determining which candidate processors have reported hot spots and when the hot spot on each candidate processor was reported;
  - prioritizing processors with data affinity with the instant processor;
  - further prioritizing unutilized processors with data affinity with the instant processor; and
  - further prioritizing processors that have not recently reported hot spots.

4. The method of claim 3, further comprising the step of:
- idling, for a first predetermined amount of time, the task on the instant processor if all of the candidate processors have reported a hot spot within a preceding second predetermined amount of time.

5. A computer storage medium having instructions or programs which, when executed by a symmetric multiprocessor computer system, causes the computer system to perform a method of improving reliability in a symmetric multiprocessor computer system, comprising the steps of:
- checking for a hot spot occurring on one or more processors in the symmetric multiprocessor computer system; and
- if a hot spot is detected on an instant processor in the symmetric multiprocessor computer system, moving a task executing on the instant processor to one of a number of candidate processors in the symmetric multiprocessor computer system;
- wherein
- the step of moving the task executing on the instant processor to one of a number of candidate processors further comprises the steps of:
- determining which candidate processors have data affinity with the instant processor;
- determining which candidate processors with data affinity with the instant processor are unutilized;
- determining which candidate processors have reported hot spots and when the hot spot on each candidate processor was reported;
- prioritizing processors with data affinity with the instant processor;
- further prioritizing unutilized processors with data affinity with the instant processor; and
- further prioritizing processors that have not recently reported hot spots.

6. The computer-readable medium of claim 5, further comprising the step of:
- idling, for a first predetermined amount of time, the task on the instant processor if all of the candidate processors have reported a hot spot within a preceding second predetermined amount of time.

* * * * *